(12) United States Patent
Liao

(10) Patent No.: US 6,485,144 B1
(45) Date of Patent: Nov. 26, 2002

(54) PROJECTOR HANGER FRAME

(76) Inventor: Jung-Huang Liao, 58, Ma Yuan West St., Taichung (TW)

( * ) Notice: Subject to any disclaimer, the term of this patent is extended or adjusted under 35 U.S.C. 154(b) by 117 days.

(21) Appl. No.: 09/654,092

(22) Filed: Aug. 30, 2000

(51) Int. Cl.$^7$ .................. G03B 17/00; G03B 21/00
(52) U.S. Cl. .................. 352/243; 348/151; 352/242
(58) Field of Search .................. 352/242, 243; 248/317

(56) References Cited

U.S. PATENT DOCUMENTS 4,160,999 A * 7/1979 Claggett ............... 348/151
4,750,832 A * 6/1988 Lloyd, Sr. et al. ........ 352/243
5,541,820 A * 7/1996 McLaughlin ........... 362/253

* cited by examiner

*Primary Examiner*—Russell Adams
*Assistant Examiner*—Michelle Nguyen
(74) *Attorney, Agent, or Firm*—Leong C. Lei

(57) ABSTRACT

A projector hanger frame has a hollow square plate having a center hole, a collar disposed on the hollow square plate, a hanger tube passing through the hollow square plate and the collar, the hanger tube having a bottom flange and a positioning aperture, a connection seat engaging with the hollow square plate, a positioning seat engaging with the connection seat, a pair of first extensible plate disposed on a bottom of the positioning seat, and a pair of second extensible plate disposed on a bottom of the positioning seat.

5 Claims, 11 Drawing Sheets

PROJECTOR HANGER FRAME

BACKGROUND OF THE INVENTION

The present invention relates to a projector hanger frame. More particularly, the present invention relates to a hanger frame for various types of projectors.

Referring to FIG. 1, a first conventional projector hanger frame has a hanger tube 10A, and a square plate 15A disposed on a bottom of the hanger tube 10A. The square plate 15A has a plurality of through holes 16A. A projector 20A has a plurality of threaded holes 21A and a plurality of heat radiation holes 22A. The square plate 15A is disposed on the projector 20A. A plurality of bolts 25A fasten the square plate 15A and the projector 20A together via the through holes 16A and the threaded holes 21A. Since the square plate 15A covers the heat radiation holes 22A, the radiation effeiciency of the projector 20A is poor.

Referring to FIG. 2, a second conventional projector hanger frame has a hanger tube 10B, and a rectangular plate 15B disposed on a bottom of the hanger tube 10B. The rectangular plate 15B has a plurality of through holes 16B. A projector 20B has a plurality of threaded holes 21B and a plurality of heat radiation holes 22B. The rectangular plate 15B is disposed on the projector 20B. A plurality of bolts 25B fasten the rectangular plate 15B and the projector 20B together via the through holes 16B and the threaded holes 21B. Since the rectangular plate 15B covers the heat radiation holes 22B, the radiation effeiciency of the projector 20B is poor.

Referring to FIG. 3, a third conventional projector hanger frame has a hanger tube 10C, and a rectangular plate 15C disposed on a bottom of the hanger tube 16C. The rectangular plate 15C has a plurality of through holes 16C. A projector 20C has a plurality of threaded holes 21C and a plurality of heat radiation holes 22C. The rectangular plate 15C is disposed on the projector 20C. A plurality of bolts 25C fasten the rectangular plate 15C and the projector 20C together via the through holes 16C and the threaded holes 21C. Since the rectangular plate 15C covers the heat radiation holes 22C, the radiation effeiciency of the projector 20C is poor.

Referring to FIG. 4, a fourth conventional projector hanger frame has a hanger tube 10D, and a rectangular plate 15D disposed on a bottom of the hanger tube 10D. The rectangular plate 15D has a plurality of through holes 16D. A projector 20D has a plurality of threaded holes 21D and a plurality of heat radiation holes 22D. The rectangular plate 15D is disposed on the projector 20D. A plurality of bolts 25D fasten the rectangular plate. 15D and the projector 20D together via the through holes 16D and the threaded holes 21D. Since the rectangular plate 15D covers the heat radiation holes 22D, the radiation effeiciency of the projector 20D is poor.

SUMMARY OF THE INVENTION

An object of the present invention is to provide a projector hanger frame. which is suitable for various types of projectors.

Another object of the present invention is to provide a projector hanger frame which is disposed on a projector to maintain a radiation effeiciency of the projector.

Another object of the present invention is to provide a projector hanger frame which is disposed on a projector to adjust an angle of a projector easily.

Accordingly, a projector hanger frame comprises a hollow square plate having a center hole, a collar disposed on the hollow square plate, a hanger tube passing through the hollow square plate and the collar, the hanger tube having a bottom flange and a positioning aperture, a connection seat engaging with the hollow square plate, a positioning seat engaging with the connection seat, a pair of first extensible plates disposed on a bottom of the positioning seat, and a pair of second extensible plates disposed on the bottom of the positioning seat.

DETAILED DESCRIPTION OF THE INVENTION

Figure 1:
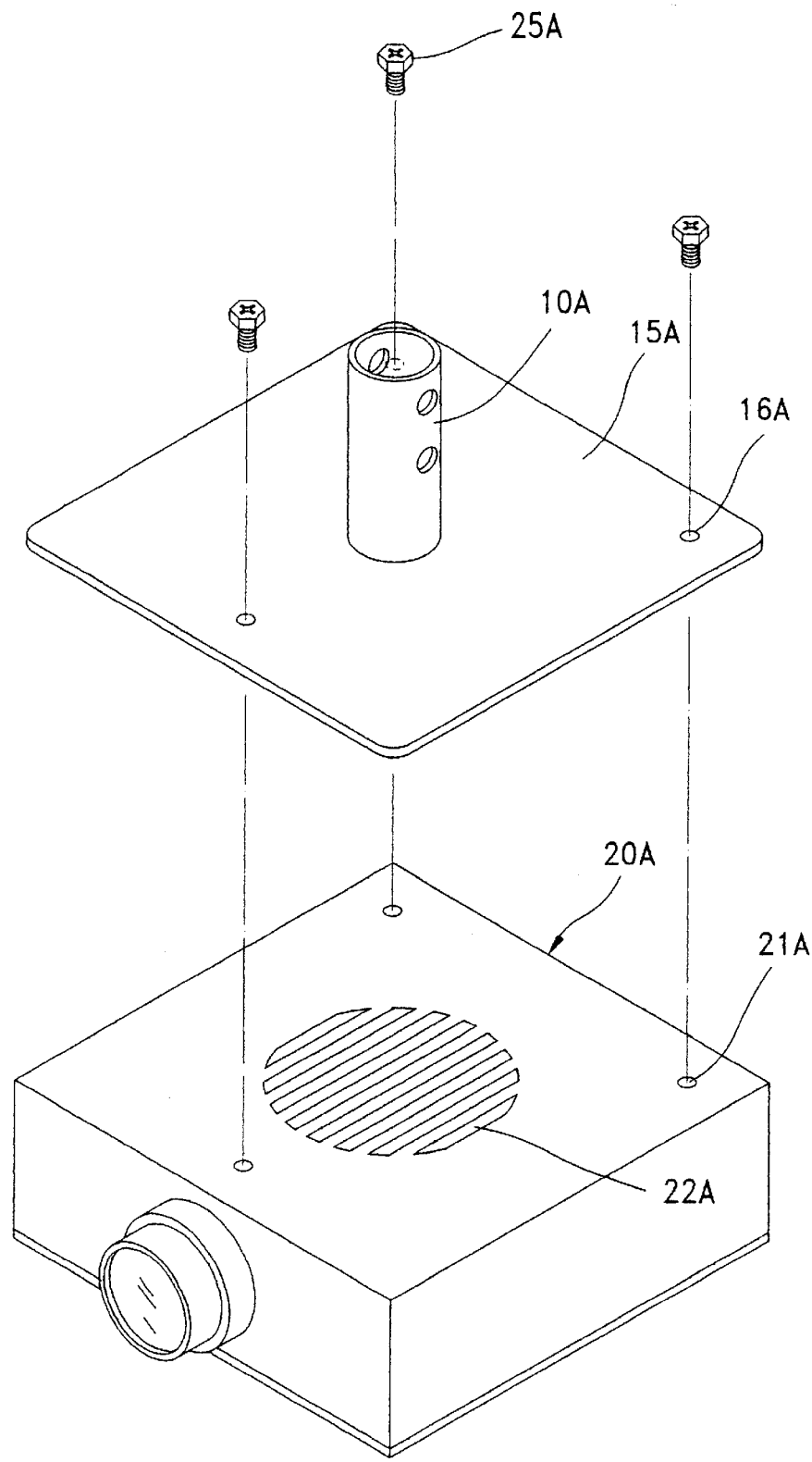
FIG. 1 is a perspective view of a projector hanger frame and a projector of a first prior art.
Figure 2:
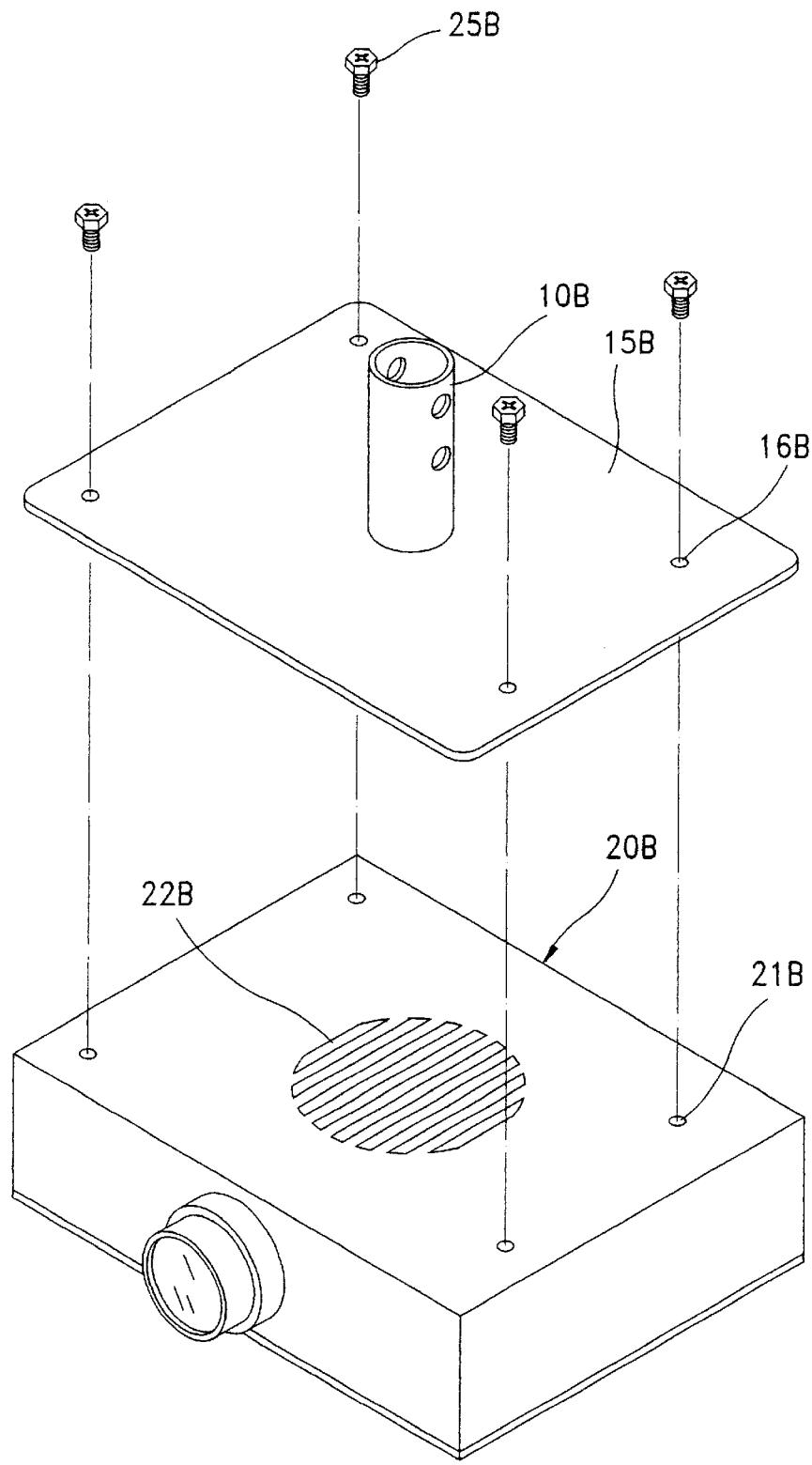
FIG. 2 is a perspective view of a projector hanger frame and a projector of a second prior art.
Figure 3:
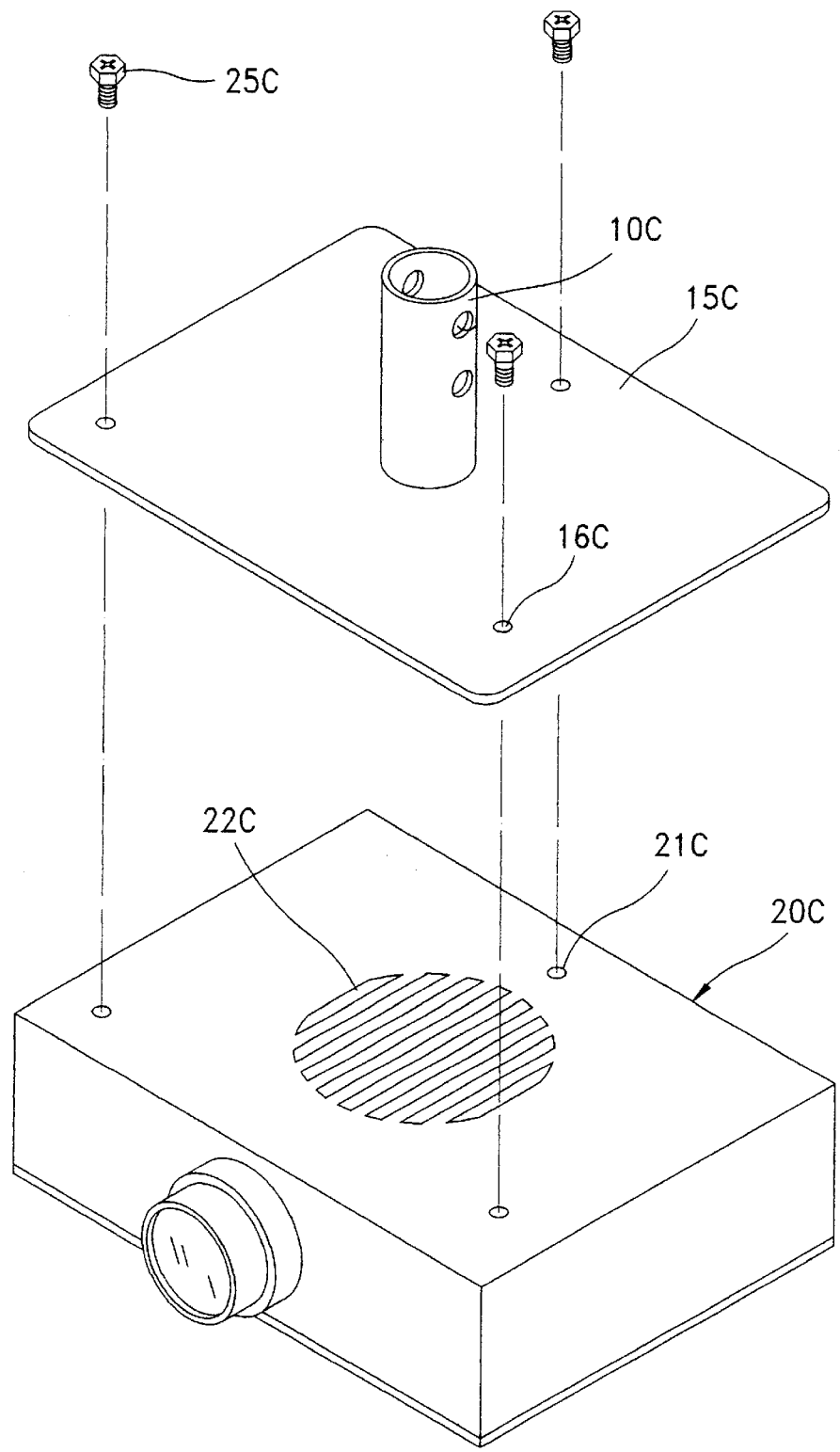
FIG. 3 is a perspective view of a projector hanger frame and a projector of a third prior art.
Figure 4:
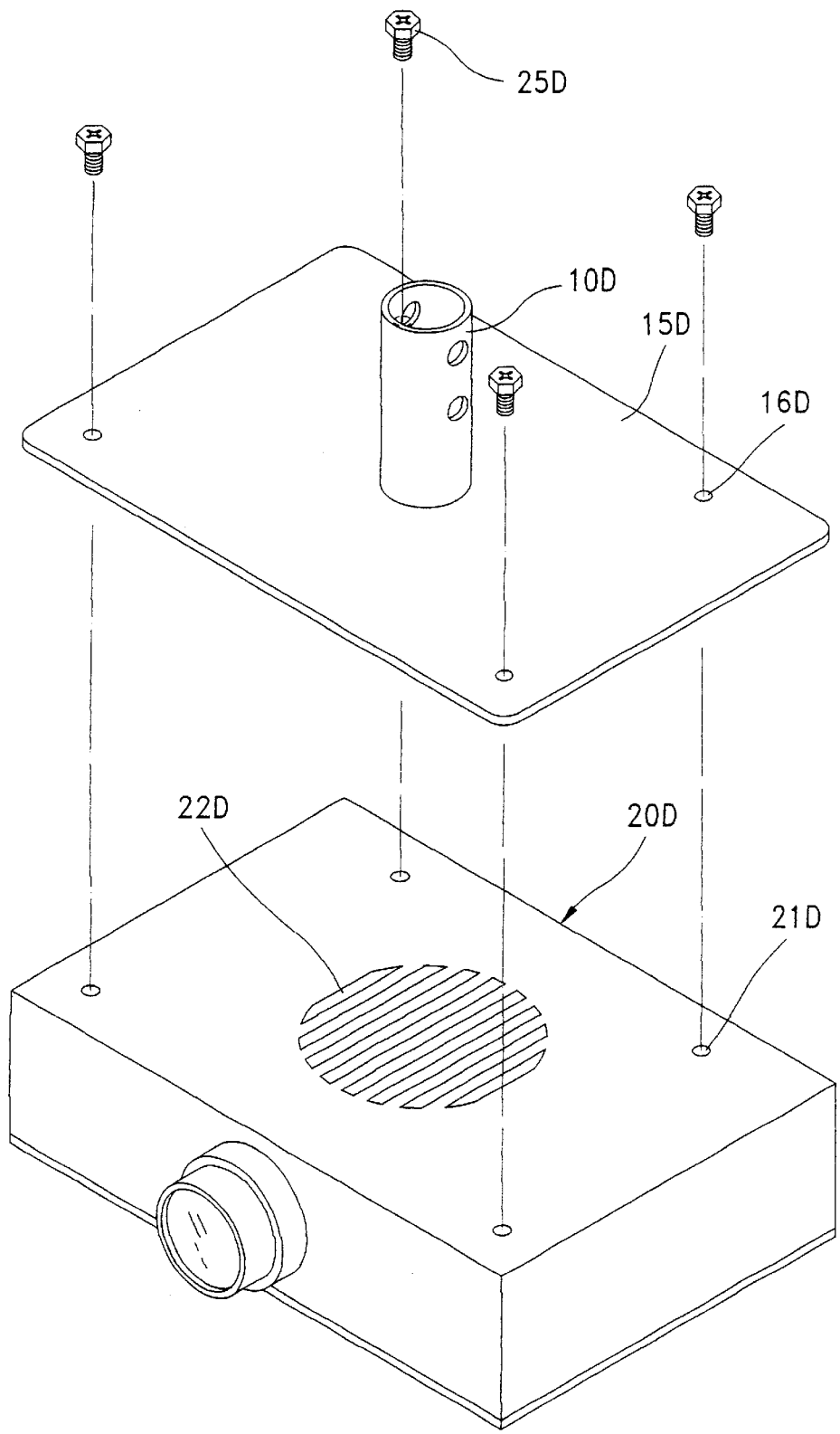
FIG. 4 is a perspective view of a projector hanger frame and a projector of a fourth prior art.
Figure 5:
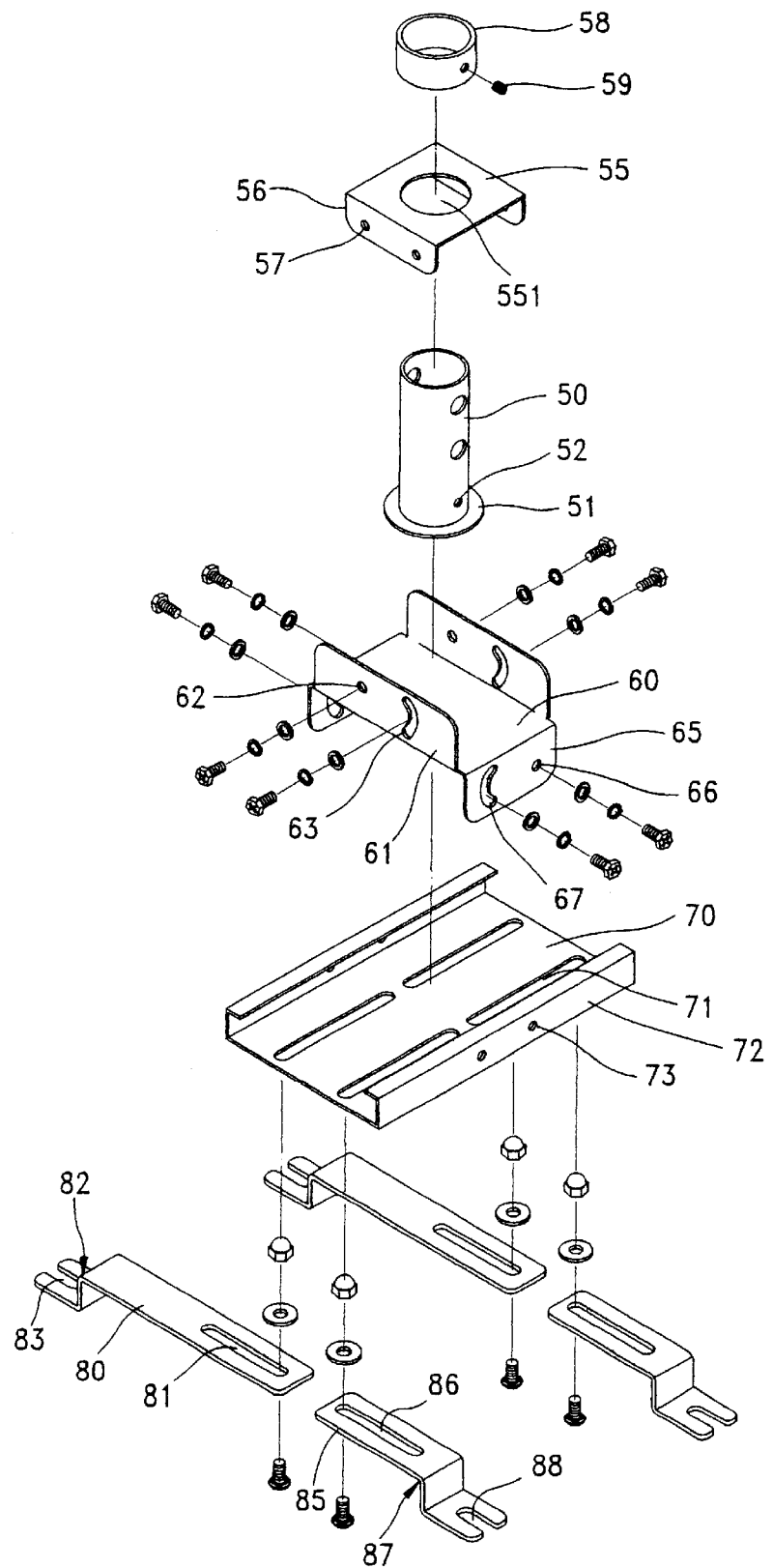
FIG. 5 is a perspective exploded view of a projector hanger frame and a projector of a preferred embodiment in accordance with the present invention.
Figure 6:
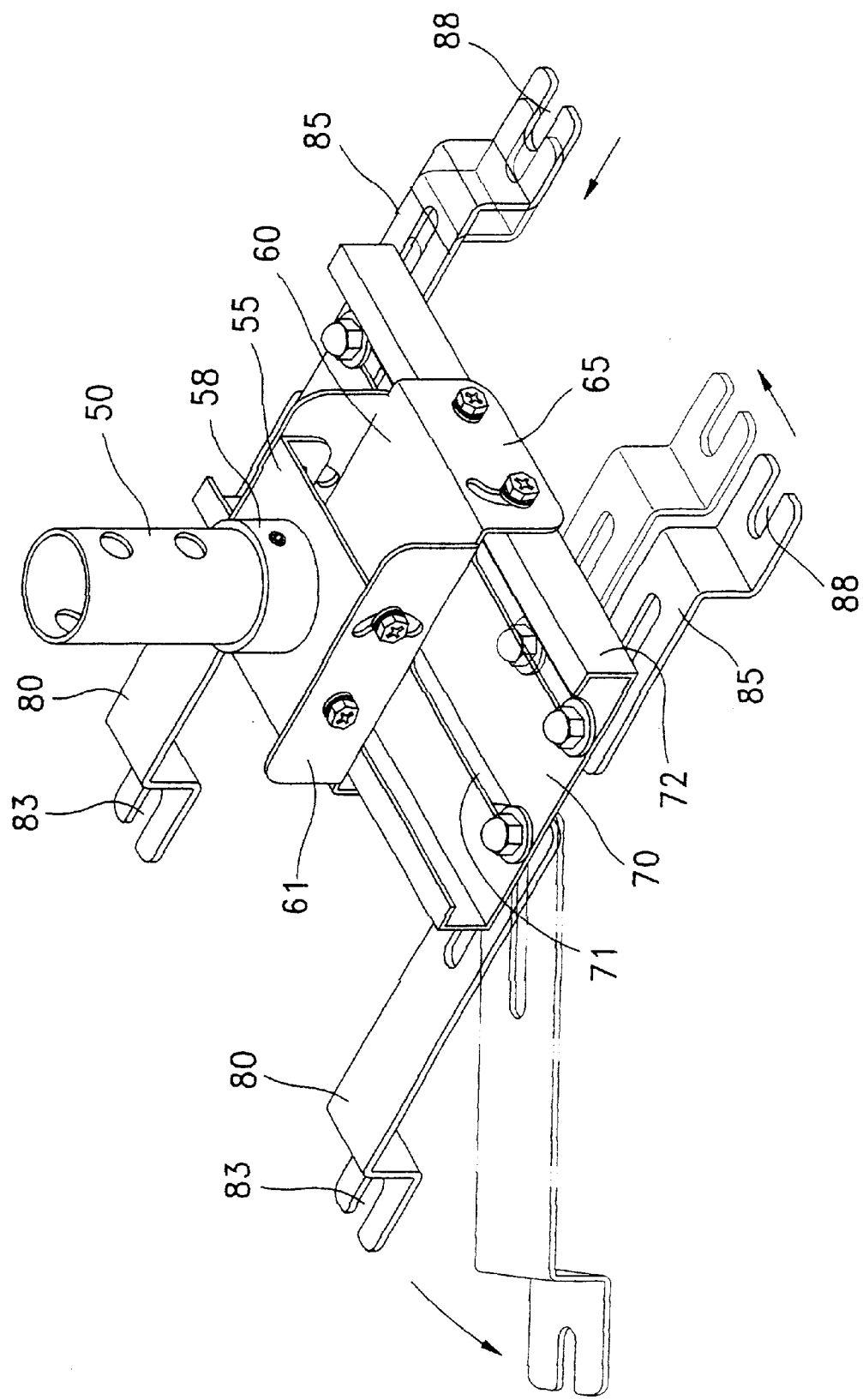
FIG. 6 is a perspective assembly view of a projector hanger frame of a preferred embodiment in accordance; with the present invention.

Referring to FIGS. 5 and 6, a projector hanger frame comprises a hollow square plate 55 having a center hole 551, a collar 58 disposed on the hollow square plate 55, a hanger tube 50 passing through the hollow square plate 55 and the collar 58, the hanger tube 50 having a bottom flange 51 and a positioning aperture 52, a connection seat 60 engaging with the hollow square plate 55, a positioning seat 70 engaging with the connection seat 60, a pair of first extensible plates 80 disposed on a bottom of the positioning seat 70, and a pair of second extensible plates 85 disposed on the bottom of the positioning seat 70.

A stud 59 fastens the collar 58 and the hanger tube 50 together. The bottom flange 51 of the hanger tube 50 blocks the hollow square plate 55.

Two downward lateral plates 56 are disposed on two sides of the hollow square plate 55. Each downward lateral plate 56 has two threaded holes 57.

The connection seat 60 has two opposite upward lateral plates 61 and two opposite distal lug plates 65.

Each upward lateral plate 61 has a circular aperture 62 and a camber-shaped hole 63.

Each distal lug plate 65 has a round hole 66 and a camber-shaped aperture 67.

The upward lateral plates 61 of the connection seat 60 block the downward lateral plates 56 of the hollow square plate 55. The upward lateral plates 61 of the connection seat 60 and the downward lateral plates 56 of the hollow square plate 55 are fastened together.

The positioning seat 70 has two pairs of oblong holes 71 and two lateral L-shaped plates 72. Each lateral L-shaped plate 72 has a plurality of threaded apertures 73.

The distal lug plates 65 block the lateral L-shaped plates 72. The distal lug plates 65 and the lateral L-shaped plates 72 are fastened together.

Each first extensible plate 80 has a first oblong aperture 81, a first bended portion 82, and a first end slot 83.

Each second extensible plate 85 has a second oblong aperture 86, a second bended portion 87, and a second end slot 88.

The first extensible plates 80 and the positioning seat 70 are fastened together.

The second extensible plates 85 and the positioning seat 70 are fastened together.

Figure 7A:
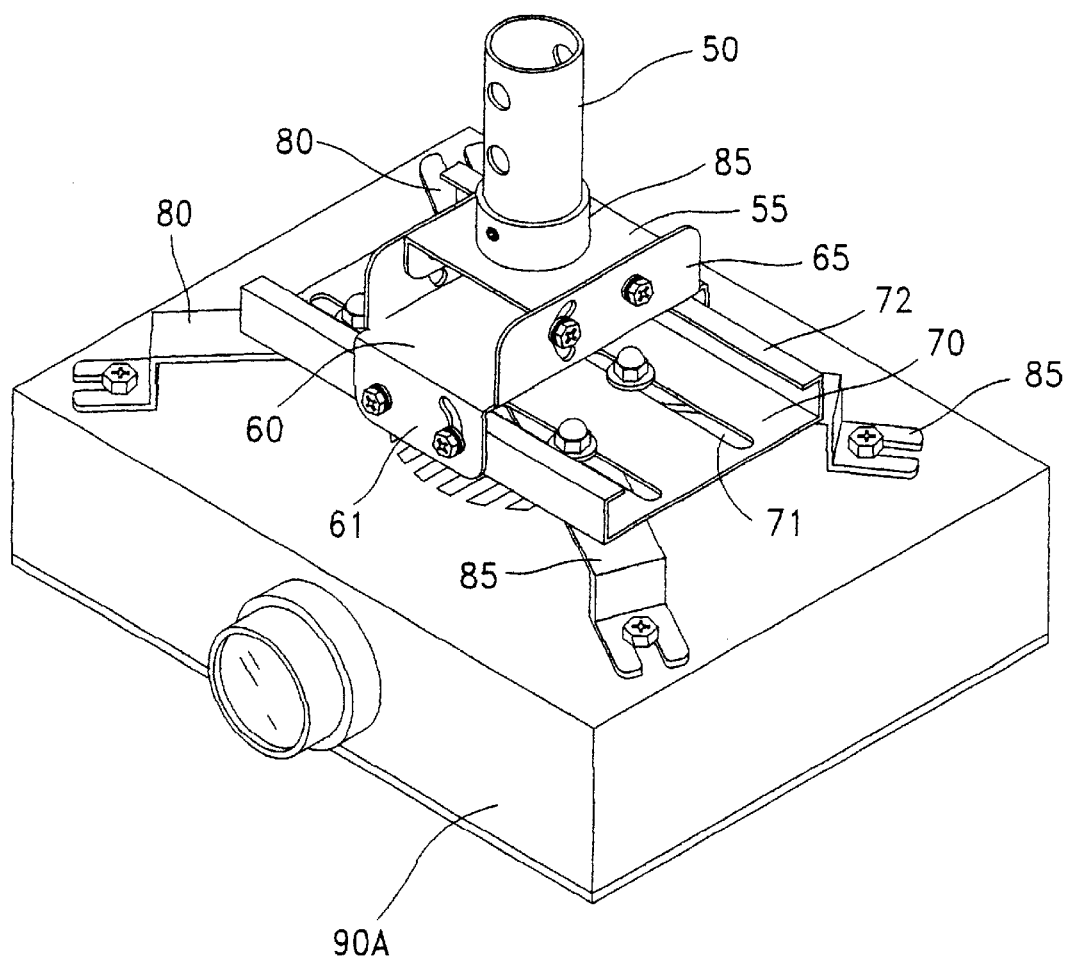
FIG. 7A is a perspective assembly view of a projector hanger frame and a first projector.

Referring to FIG. 7A, the first extensible plates 80 and the second extensible plates 85 are fastened on a projector 90A.

Figure 7B:
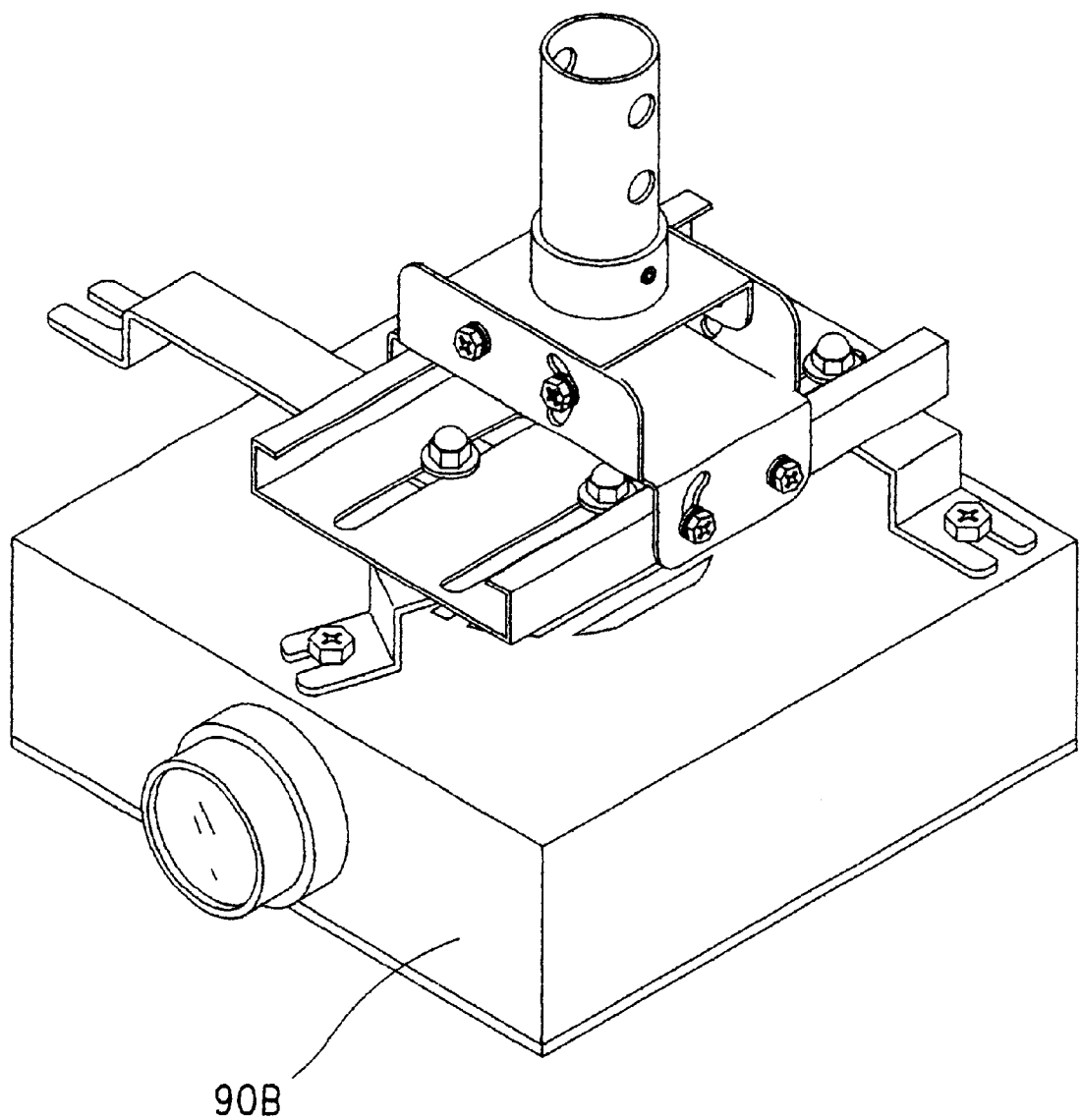
FIG. 7B is a perspective assembly view of a projector hanger frame and a second projector.

Referring to FIG. 7B, the first extensible plates 80 and the second extensible plates 85 are fastened on a projector 90B.

Figure 7C:
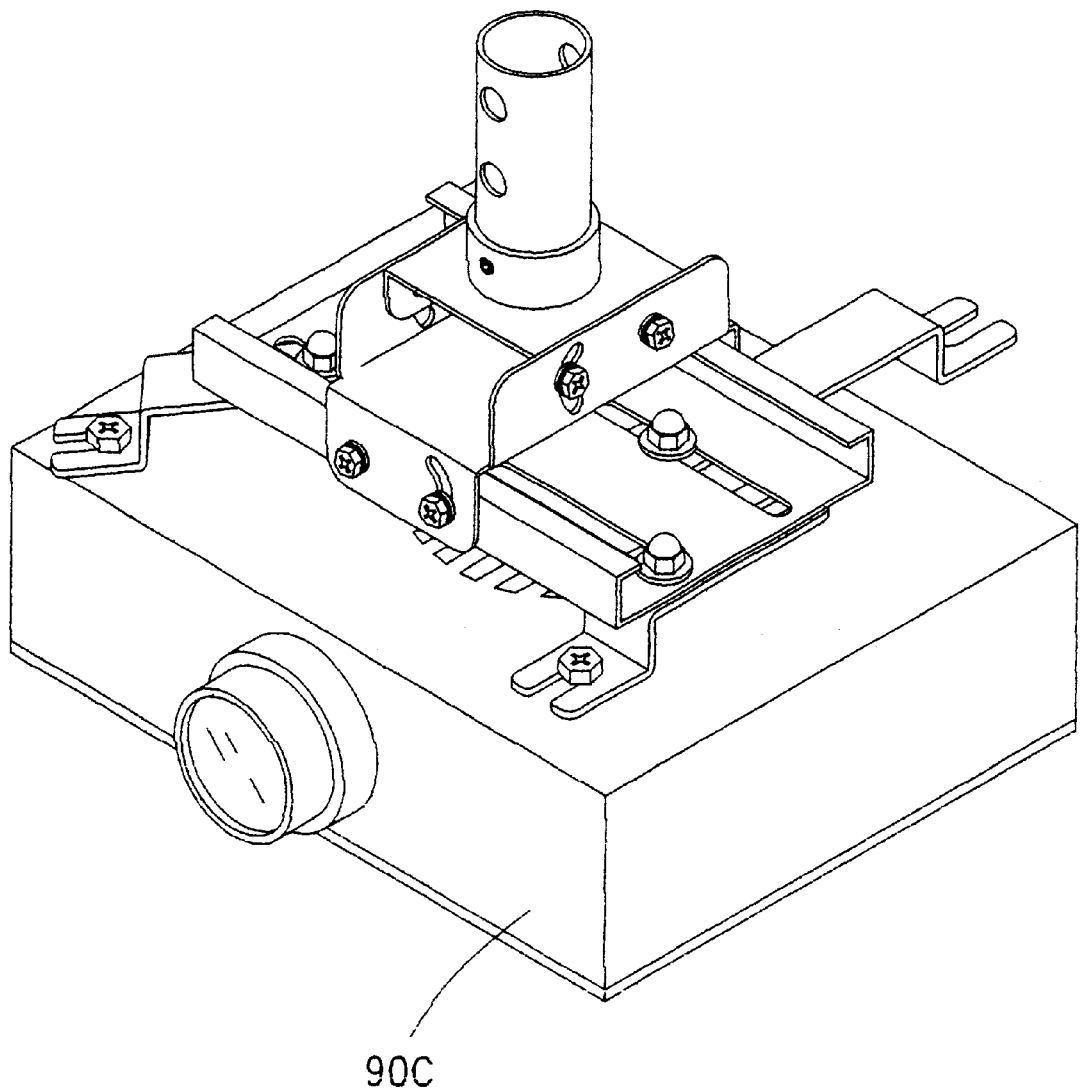
FIG. 7C is a perspective assembly view of a projector hanger frame and a third projector.

Referring to FIG. 7C, the first extensible plates, 80 and the second extensible plates 85 are fastened on a projector 90C.

Figure 7D:
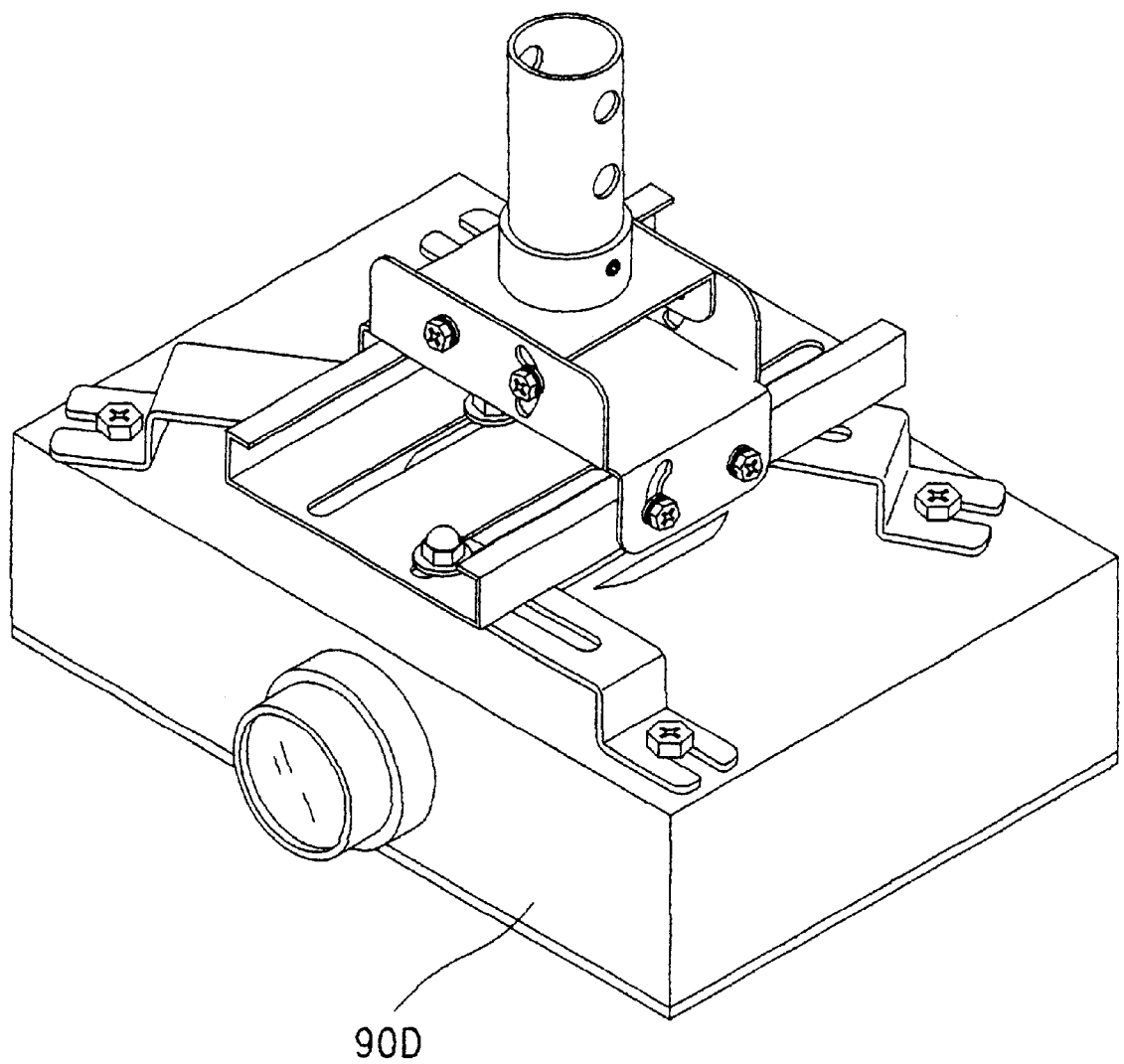
FIG. 7D is a perspective assembly view of a projector hanger frame and a fourth projector.

Referring to FIG. 7D, the first extensible plates 80 and the second extensible plates 85 are fastened on a projector 90D.

Figure 8A:
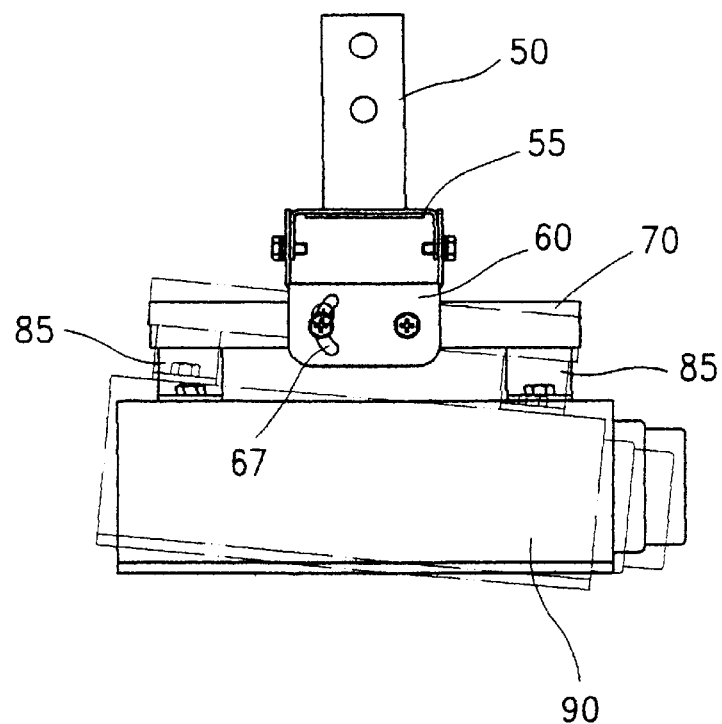
FIG. 8A is a schematic view illustrating an adjustment of an angle of a projector hanger frame of a preferred embodiment in accordance with the present invention.
Figure 8B:
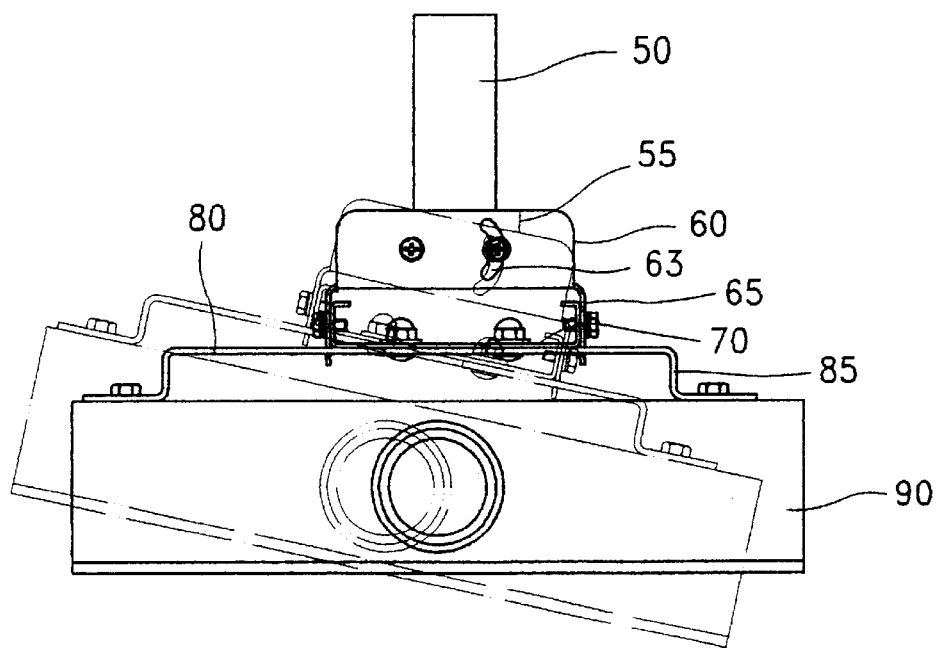
FIG. 8B is a schematic view illustrating another adjustment of an angle of a projector hanger frame of a preferred embodiment in accordance with the present invention.

Referring to FIGS. 8A and 8B, the first extensible plates 80 and the second extensible plates 85 are fastened on a projector 90. One of the threaded apertures 73 of the lateral L-shaped plate 72 is moved along the respective camber-shaped aperture 67 of the distal lug plate 65 in order to adjust the angle of the projector 90. =The invention is not limited to the above embodiment but various modification thereof may be made. Further, various changes in form and detail may be made without departing from the scope of the invention.

I claim:

1. A projector hanger frame comprises:
   a hollow square plate having a center hole,
   a collar disposed on the hollow square plate,
   a hanger tube passing through the hollow square plate and the collar,
   the hanger tube having a bottom flange and a positioning aperture,
   a connection seat engaging with the hollow square plate,
   a positioning seat engaging with the connection seat,
   a pair of first extensible plates disposed on a bottom of the positioning seat, and
   a pair of second extensible plates disposed on the bottom of the positioning seat.

2. The projector hanger frame as claimed in claim 1, wherein two downward lateral plates are disposed on two sides of the hollow square plate, and each said downward lateral plate has two threaded holes.

3. The projector hanger frame as claimed in claim 2, wherein the connection seat has two opposite upward lateral plates and two opposite distal lug plates, each said upward lateral plate has a circular aperture and a camber-shaped hole, each said distal lug plate has a round hole and a camber-shaped aperture, the upward lateral plates of the connection seat block the downward lateral plates of the hollow square plate, and the upward lateral plates of the connection seat and the downward lateral plates of the hollow square plate are fastened together.

4. The projector hanger frame as claimed in claim 3, wherein the positioning seat has two pairs of oblong holes and two lateral L-shaped plates, each said lateral L-shaped plate has a plurality of threaded apertures, the distal lug plates block the lateral L-shaped plates, and the distal lug plates and the lateral L-shaped plates are fastened together.

5. The projector hanger frame as claimed in claim 4, wherein each said first extensible plate has a first oblong aperture, a first bended portion, and a first end slot, each said second extensible plate has a second oblong aperture, a second bended portion, and a second end slot, the first extensible plates and the positioning seat are fastened together, and the second extensible plates and the positioning seat are fastened together.

\* \* \* \* \*